(12) United States Patent
Veugen

(10) Patent No.: US 8,938,075 B2
(45) Date of Patent: Jan. 20, 2015

(54) METHOD AND DEVICE FOR ESTABLISHING A COMMUNICATION SESSION

(75) Inventor: Peter Joannes Mathias Veugen, Voorburg (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 593 days.

(21) Appl. No.: 13/202,891
(22) PCT Filed: Feb. 24, 2010
(86) PCT No.: PCT/NL2010/050093
§ 371 (c)(1),
(2), (4) Date: Oct. 6, 2011
(87) PCT Pub. No.: WO2010/098662
PCT Pub. Date: Sep. 2, 2010

(65) Prior Publication Data
US 2012/0039470 A1 Feb. 16, 2012

(30) Foreign Application Priority Data
Feb. 25, 2009 (EP) ..................................... 09153603

(51) Int. Cl.
*H04K 1/00* (2006.01)
*H04L 9/32* (2006.01)
(Continued)

(52) U.S. Cl.
CPC ........ *H04L 63/0421* (2013.01); *H04L 63/0428* (2013.01); *H04L 9/32* (2013.01);
(Continued)

(58) Field of Classification Search
CPC ... H04L 9/0838; H04L 9/0844; H04L 9/3221; H04L 9/32; H04L 9/3236; H04L 9/3242; H04L 9/3244; H04L 9/3271; H04L 9/3273; H04L 63/04; H04L 63/0421; H04L 63/0428; H04L 63/0442; H04L 63/0869; H04L 2209/42; H04L 2209/46; H04L 29/06639; H04L 29/06653
USPC .......... 709/201, 202, 227–229; 380/255, 270, 380/277, 285; 713/150, 162, 163
See application file for complete search history.

(56) References Cited

U.S. PATENT DOCUMENTS

2004/0203363 A1* 10/2004 Carlton et al. ............... 455/41.2
2007/0150404 A1*  6/2007 Golle ............................. 705/37
2008/0052288 A1*  2/2008 Flinn et al. ....................... 707/6

FOREIGN PATENT DOCUMENTS

WO    WO 2004/111747    12/2004
WO    WO 2008/079376     7/2008

OTHER PUBLICATIONS

Montreuil, et al., "The Marriage Proposals Problem: Fair and Efficient Solution for Two-Party Computations", 2004, Proceedings Indocrypt, pp. 33-47.*
(Continued)

*Primary Examiner* — Evans Desrosiers
*Assistant Examiner* — Daniel Potratz
(74) *Attorney, Agent, or Firm* — Swanson & Bratschun, L.L.C.

(57) ABSTRACT

Devices are provided with secret information to indicate which other devices are eligible to establish communication sessions. Information leaks about the eligibility of devices are prevented when no communication sessions are established. Each device makes a set of preference information items publicly available. Each preference information item selects an eligible device in cloaked way. Each protected information item contains protected information such as an encrypted random number that can be decrypted only by the eligible device. When a request to establish a communication is processed by a first and second device, the first and second device indicate which of their preference information items should be used. The devices then each attempt to decrypt the protected information from the other one's indicated preference information item and each combines the result with the protected information used to make the preference information item that it indicated to the other. The results from the first and second device are compared and when a match is detected, establishment of the communication session is enabled. If no match is detected a first device that did not make the second device eligible is unable to detect whether it was made eligible by the second device.

15 Claims, 3 Drawing Sheets

(51) Int. Cl.
  *H04L 29/08* (2006.01)
  *H04L 9/08* (2006.01)
  *H04L 29/06* (2006.01)
  *H04W 4/02* (2009.01)
(52) U.S. Cl.
  CPC ............ *H04L 63/04* (2013.01); *H04L 63/101* (2013.01); *H04L 67/14* (2013.01); *H04L 9/083* (2013.01); *H04L 9/3236* (2013.01); *H04W 4/02* (2013.01); *H04L 2209/80* (2013.01)
  USPC ............ 380/270; 380/285; 713/150; 713/162

(56) References Cited

OTHER PUBLICATIONS

Lee, et al., "Secure Matchmaking Protocol", 2001, Lecture Notes in Computer Science 2015:123-134, Information and Communication University.*

International Search Report for corresponding International Application No. PCT/NL2010/050093 mailed May 3, 2010.

Montreuil et al., "The Marriage Proposals Problem: Fair and Efficient Solution for Two-Party Computations", Proceedings Indocrypt 2004, pp. 33-47—XP002540595.

Boudot, et al. (2001) Discrete Applied Mathematics 111:23-36, "A Fair and Efficient Solution to the Socialist Millionaires' Problem".

Lee and Kim (2001) Lecture Notes in Computer Science 2015:123-134, Information and Communication University, "Secure Matchmaking Protocol".

* cited by examiner

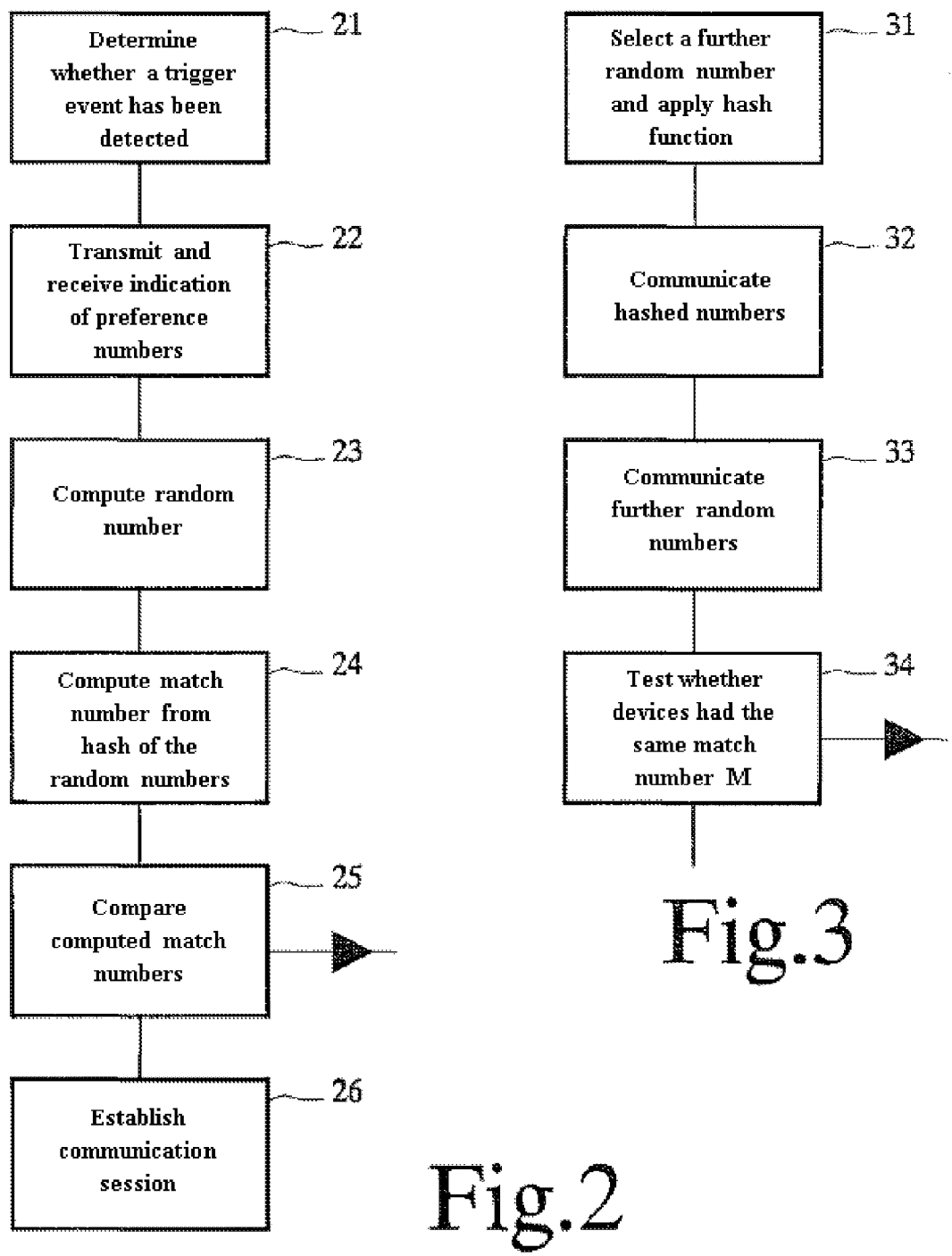

METHOD AND DEVICE FOR ESTABLISHING A COMMUNICATION SESSION

RELATED APPLICATIONS

This application is a 35 U.S.C. §371 national phase application of PCT/NL2010/050093 (WO 2010/098662), filed on Feb. 24, 2010, entitled "Method and Device for Establishing a Communication Session", which application claims the benefit of European Patent Application No. 09153603.7, filed Feb. 25, 2009, which is incorporated herein by reference in its entirety.

FIELD OF THE INVENTION

The invention relates to a communication device, a system of such communication devices and a method of communicating between such communication devices.

BACKGROUND

Communication between devices in a communication system conventionally involves communication sessions, each session involving two devices, or optionally a larger subgroup of all devices. A common example is a session involving a first and second mobile telephone device, started by dialing the telephone number of the first device from the second device. The session may involve exchanging speech signals selectively between the two devices, and/or data signals, such a signals used to control a common game controlled from the two devices.

Various conditions can be imposed by the devices in order to decide whether or not to allow the establishment of a session. A familiar condition is that a receiving mobile telephone device compares the telephone number of the calling mobile telephone device against a list of allowed (or prohibited) numbers and establishes the session only if the caller's telephone number is on the list of allowed numbers (or not if the caller's telephone number is on the list of prohibited numbers).

A disadvantage of such methods of establishing sessions is that confidential information that the caller indeed attempted to establish the call, may needlessly be revealed. If this information must be kept secret, this may be partly achieved by letting pairs of communication devices run through session establishment processes independent of whether establishment of a session is requested. However, at some stage during such a session establishment process the calling device must reveal whether it actually requests to establish a session, thereby possibly enabling the other communication device to obtain information about this before the other communication device has indicated whether the request will be accepted. On the other hand, if the other communication device has to indicate that a request will be accepted before the request has been revealed, information about the list of allowed (or prohibited) numbers may leak out without establishing a communication session.

Concepts from cryptography may be considered to prevent that such information is revealed. A. Montreuil and J. Patarin have published an article titled "The Marriage Proposal Problem: Fair and Efficient Solution for Two-Party computations", in A. Canteaut and K. Viswanathan (Eds.): INDOCRYPT 2004, LNCS 3348, pp. 33-47, 2004. Herein the "Marriage Proposal Problem" is a colorful name for the problem of letting two parties determine whether they agree to a proposal, without letting the parties know whether the other party agreed if the parties do not both agree. Apart from more technical applications, such a determination could conceivably also be used in amorous relations between professors of mathematics, if they are extremely persistent.

In terms of logic operations, Montreuil et al disclose a method that allows two parties to compute the AND function of two logic (binary) values that are each available to a respective one of the parties only. A four step algorithm is used for solving this problem. The algorithm is designed to provide for two computation routes to compute a "match number" dependent on the logic values. The match numbers obtained via the respective computation routes are equal only if the logic values with predetermined logic values are used. Each computation route to compute the match number involves random information available only to a respective one of the parties and the logic value of that party, as well as information from the other party that depends in a cloaked way on the logic value and random information from the other party.

Montreuil's algorithm is based on the "discrete logarithm assumption", which says that given a result obtained by raising a known number to a random exponent, it is practically impossible to compute the exponent from that result if sufficiently large numbers are used. The discrete logarithm assumption makes it possible to prove knowledge of a secret (random) exponent while keeping the exponent itself secret, by disclosing results of raising numbers to the secret exponent to allow verification that a common exponent has been used.

In a first step of Montreuil's algorithm both parties mutually commit themselves to fix their own secret random exponent by means of this assumption. In a second step both parties compute functions of their logic values, again raising numbers to exponents, this time using their own logic value in the exponent together with random information that cloaks the logic value. In a third step both parties compute products that combine their mutual results from the second step and raise products to the secret random exponent to which they committed themselves in the first step. The third step results in match numbers that have been computed along different routes, and for which it can respectively be verified that each can be computed only if the secret random exponent has been used to which the respective parties have committed themselves in the first step. Finally, the match numbers are compared. Montreuil et al have proved that their algorithm is robust against various attacks to discover the secret logic values by devices that do not reveal their own logic value to the other.

Applied to the establishment process of a communication session between communication devices such as mobile telephones, this algorithm would involve the selection of random numbers in the mobile telephones, computation of exponentiations using various exponents, transmitting computed numbers to the other mobile telephone, performing further computations etc. Finally, the mobile phones establish a joint communication session only if resulting match numbers are equal. When the match numbers are not equal, the algorithm ensures that the mobile telephone that was the cause of the mismatch has no information whether the other mobile telephone was not also the cause of the mismatch.

However, although such a process is robust against attacks in a one-to-one process, it is less robust in a more open environment, where further conditions may be imposed. For example, in a system with many devices, wherein it is intended that each device is enabled only to establish sessions with a secret few preselected eligible devices, the process may not be robust against an attacker device that attempts a search for other devices for which it is eligible without letting the other devices detect this, or a "desperate" attacker device that attempts to establish a communication session with any device that has made the attacker eligible.

SUMMARY

Among others, it is an object to enable establishment of communication sessions using selectable pairs of devices in a communication system, without releasing information that a first device is eligible to establish a communication session with a second device unless the second device is also eligible to establish the communication session with the first device.

A method according to claim 1 is provided. Herein subsets of eligible devices are first fixed for all devices before attempt can be made to establish communication sessions, or at least for a first and second device for which establishment is attempted. Subsequent communication sessions may be voice calls, or data communication sessions for playing common game for example. Each device has its own specific subset of eligible devices. The subset typically consists of only a fraction of the devices in the system, say less than half or even less. Because it is a subset, the subset is at least smaller than the number of devices in the system other than the device for which the subset is provided.

The subset is fixed by making sets of preference information items irrevocably available for each of the devices, or at least for the first and second device for which establishment of the communication session is to be attempted. Each preference information item comprises a protected information item (e.g. a random number) subject to decryption with a decryption key that can be used only by the eligible device selected by the preference information item. In addition the protected information items can be retrieved by the device for which the set of preference information items is made available, given the eligible device.

In order to enable establishment of a communication session between a first and second device, the first device retrieves the protected information item that it has for the other device. Furthermore, it receives an indication of an available preference information item from the second device and decrypts the protected information item from the indicated preference information item. In an embodiment the first device may check that the second device has not made more than a predetermined number of preference information items available, so as to exclude that the second device attempts to make all devices eligible. The first device applies a one way function to a combination of the resulting protected information items. The second device performs a mirror image of these operations. The devices transmit results of the application of the one way function to enable a test whether their results of the one way function match and dependent on whether a match is detected, the establishment of the communication session is enabled.

When the first and second device have indicated preference information items to each other wherein they make each other mutually eligible, i.e. when both are able to decrypt the protected information item that is retrievable by the other, the one way functions in both devices will yield the same result in both devices. If at least one of the devices did not make the other eligible, the results are not the same, but the device that did not make the other eligible cannot know whether the other did the same or not. Moreover, it is impossible to probe other devices without first making them eligible. Because the latter is done using a limited number of preference information items without requiring contact with the elected devices, the method excludes the ability to adapt to an arbitrary device selected only after contact.

When the first device has not made the second device eligible, so that the first device has no preference information item for the second device, an arbitrary one of the preference information items of the first device may be indicated. This has the result that no match will be detected, because the decryption key of the second device does not make it possible to retrieve the protected information item. The same holds if the second device has not made the first device eligible.

The indication of the preference information items for use in the attempt establish a communication session between the first and second device may be implemented by means of messages of the devices to each other, each indicating to the other which one of its previously available set of preference information items should be used. This reduces the possibilities of attack. Alternatively, the indications may be made available in advance by assigning devices to preference information items, for example when the set of preference information items is made available. In this case, a plurality of devices may be assigned to each preference information item, only one of which is the "correct" device that has the decryption key needed to open the preference information item.

The method may be implemented by means of communication devices with a receiver, a transmitter and a processing circuit. In order to establish a communication session with a further device, the processing circuit performs the steps of decrypting a first protected information item from an indicated preference information item using the decryption key of the communication device, retrieving a second protected information item for the further device, deriving match data from a computation of a one way function of a combination of the first and second protected information item, comparing the match data and further match data from the further device and enabling establishment of the communication session on condition that the match data computed in the device and the further match data match with each other. The processing circuit may be a programmable processor for example, programmed with a processor readable program to perform these steps, or the processor circuit may comprise a plurality of processors, respective ones of which may be programmed with processor readable programs to perform respective part of the steps, or dedicated (non-programmable) processing circuits may be used to perform part or all of the steps.

In an embodiment the preference information items may be constructed in the devices themselves. In this case an asymmetric encryption-decryption scheme is preferably used, i.e. a scheme with mutually different encryption and decryption keys, such as the RSA encryption-decryption scheme. In this case the encryption key may be a public key of the device that is made eligible. Because the device that makes the preference information item does not have the decryption key, it cannot simulate that the preference information item made an arbitrary device eligible, by reconstructing the protected information item that that arbitrary device will decrypt from the preference information item and using the reconstructed protected information item to compute the match information.

Thus, the device is forced to use its retrievable protected information item to compute the match number. If a symmetric encryption-decryption scheme is used, wherein the encryption key and the decryption key are equal, this attack can be excluded by encrypting the protected information item in a trusted third device to make the preference information item. In an embodiment, protected information items may be sent from the devices to such a trusted device, protected by encryption, and the trusted device may compute the preference numbers and make them available. However, the need to use a trusted third party may complicate the system.

In an embodiment the preference information item is formed by combining the encrypted protected information item with an identification code that is unique for the eligible device associated with the protected information item. This makes it more difficult to construct preference information items that express eligibility of a plurality of the devices simultaneously.

In an embodiment the devices exchange commitment signals to commit themselves to the match data before comparing the match data. This may be used when it is desirable to prevent against an attack wherein an attacking device simulates a match by echoing the match number from another device. In an alternative embodiment, such an attack may be prevented by sending the match numbers to a trusted third party, but this may increase overhead and vulnerability to other attacks. Commitment to data is known per se. It may involve first sending a result of a one way function applied to the data at a time before sending the data. In commitment, the receiving device cannot determine the data with only the committing data (e.g. the result of the one way function), but after receiving the data the receiving device can verify that the data was not modified after transmission of the committing data.

In an embodiment the match data is split into a plurality of digits and the digits are revealed and compared one by one and the comparison is broken off when a mismatch is detected in any digit. This may be used if it is desirable to protect against an attack wherein a device dissimulates a match that has occurred, in order to avoid revealing that it made another device eligible. In such an attack, the attacking device could intentionally send the wrong match data so that only it can compare the right match data. By comparing digits one by one, the devices gradually reduce uncertainty about the match, so that the information advantage of the last device to reveal a digit remains small.

Thus, when a device dissimulates a match of a digit, both devices will both have approximately the same certainty whether a match has occurred, within a margin corresponding to the change of certainty involved with a single digit. In a further embodiment, digit-by-digit comparison may be combined with previous commitment to the individual digits to avoid simulation of a match. Alternatively, the sequence in which the devices must reveal a digit to each other may be selected differently for different digits.

In an embodiment broadcast of information between the devices may be used to determine devices with which the establishment of communication sessions is enabled. In this embodiment assignments of devices to preference information items are made available in advance, making it possible to compute match numbers without device to device communication. Subsequently, each device broadcasts commitments to match data for a plurality of its preference information items. After all commitments have been received the match data may broadcast, optionally encrypted with a public encryption key for the device for which is it intended. This reduces the amount of communication bandwidth.

BRIEF DESCRIPTION OF THE DRAWING

These and other objects and advantageous aspects will become apparent from a description of exemplary embodiments, using the following figures.

FIG. 2 shows a flow-chart of session establishment
FIG. 3 shows a flow-chart of committed comparison

DETAILED DESCRIPTION OF EXEMPLARY EMBODIMENTS

Figure 1:
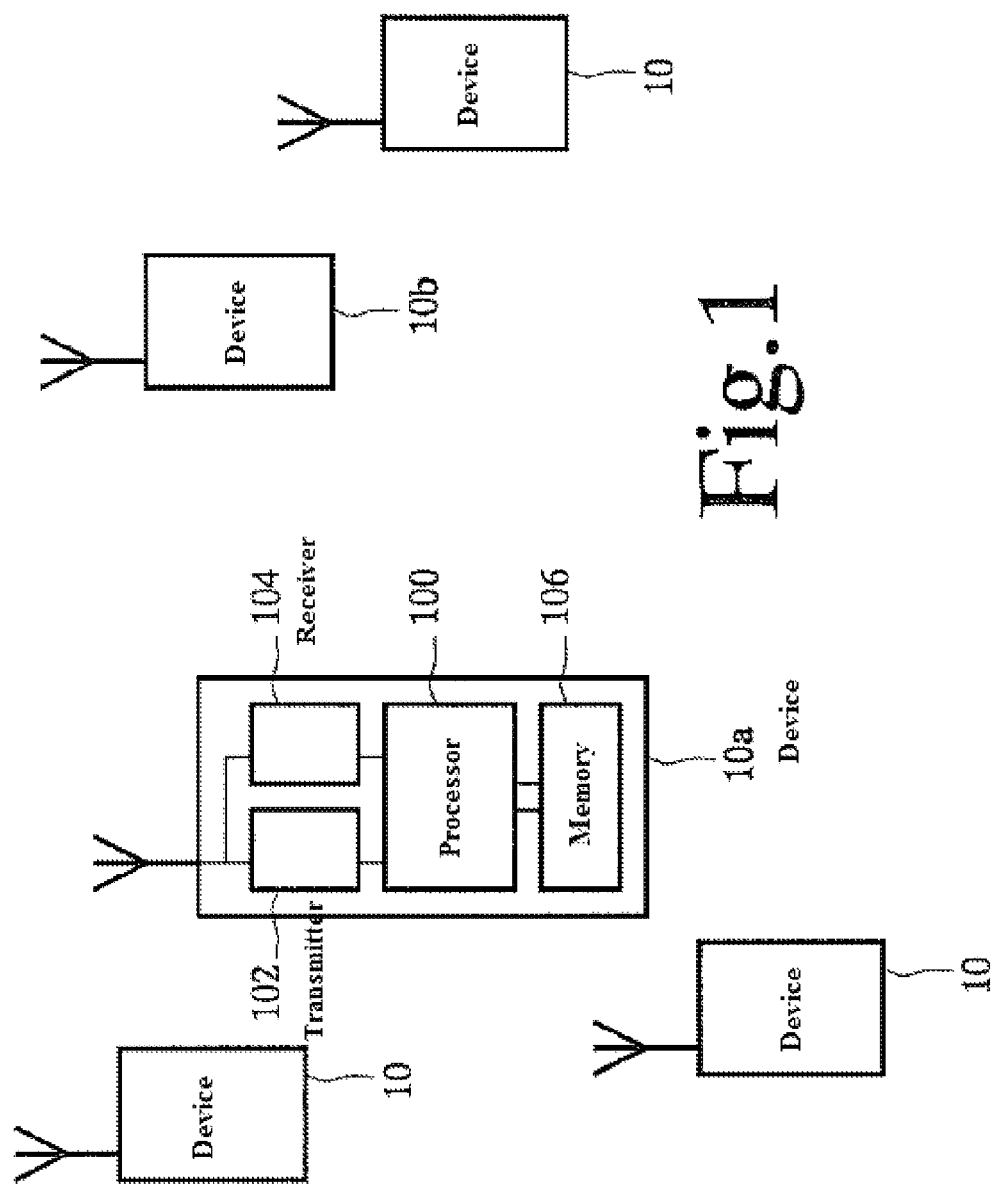
FIG. 1 shows communication devices

FIG. 1 shows communication devices 10, 10a, 10b, each comprising a processor 100, a transmitter 102, a receiver 104 and a memory 106. Transmitter 102, receiver 104 and memory 106 are coupled to processor 100. Memory 106 may be a single memory or it may comprise different sub-memories. In an embodiment memory 106 comprises a tamper protected memory. Processor 100 may be a single processor or it may comprise one or more sub-processors. In an embodiment processor 100 comprises a specialized cryptographic processor.

Processor 100 may comprise a stored computer program to control operation. Operation may involve executing a first process to establish a communication session and a second process, enabled by establishment of a communication session, to exchange information between different devices 10, 10a, 10b, transmitting information via the transmitter 102 of one device 10, 10a, 10b in the session and the receiver 104 of the other device 10, 10a, 10b in the communication session. The first process may start randomly, for example if devices 10 detect that they are in each others neighborhood (for example by outputting an sound signal from one device and detecting the sound signal at the other device, or detecting that one device touches the other).

In order to control establishment of communication sessions, at least part of the devices 10, 10a, 10b each provides for a set of one or more "preference numbers", which may be publicly available in all other devices 10, 10a, 10b, or in a central memory (not shown) that can be accessed by all devices 10, 10a, 10b. Because of the public availability, each device 10, 10a, 10b is committed to its preference numbers. Each preference number for a device 10, 10a, 10b contains cloaked information for indicating that the establishment of a communication session with a specific other device 10, 10a, 10b is allowed. Preferably, the set of preference numbers is (much) smaller than the number of devices 10, 10a, 10b with which communication is possible in principle.

In an embodiment, each preference number P of a first device 10a is computed according to $$P = F(K(i), R(i,j)) + ID(i)$$

Herein the index "i" indicates a second device 10b in the set of devices 10, 10a, 10b to which the preference applies, i.e. with which the first device 10a is allowed to establish a communication session. The function F(..,..) is an asymmetric encryption function or keyed hashing function, with a key as first argument and data to be encrypted as second argument. As is well known, asymmetric encryption and decryption involves mutually different keys (usually public and private keys) that cannot easily be derived from each other to perform encryption and decryption. The RSA encryption/decryption function may be used for example. K(i) is a public encryption key of the second device 10b indicated by the index "i", R(i,j) is a secret random number known in the first device 10 (indicated by index "j") for the indicated second device 10b and ID(i) is a publicly known identification number for the indicated second device 10b.

Typically, each device 10a may have a plurality of such preference numbers P, for selected other devices 10, 10b. These preference numbers P may be publicly accessible for all devices and the source of the preference numbers may also be publicly known. The second devices at which the preference numbers are directed (whose public key K(i) has been used) are not publicly known. The one or more random numbers R(i,j) used by the first device 10a indicated by "j" for one or more second devices 10b indicated by "i" are stored in memory 106 and kept secret from the other devices.

FIG. 2 shows a first process for establishing a communication session using such preference numbers. In a first step 21 processor 100 determines whether an event has been detected that triggers the process between a first device 10a and a second device 10b. As explained, this can be detection that the first and second device 10a,b are in each others' proximity, a randomly generated signal to attempt to establish a session or any other event.

Upon detection of the event, processor 100 executes a second step 22 wherein the first and second devices 10a,b transmit and receive information via transmitter 102 and receiver 104, indicating which of their preference numbers P1, P2 should be used in the process. This is followed by a third step 23, wherein processors 100 of each of the first and second device 10a,b compute the random number R(i,j), R(j, i) of the other device, from R(i,j)=G(K'(i),P1−ID(i)) and R(j, i)=G(K'(j), P2−ID(j)) respectively. Herein G(..,..) is an asymmetric decryption function corresponding to F(..,..) and K'(j) and K'(i) are the private keys of the first and second device 10a,b respectively. As can be noted the first random number R(i,j) can be computed in this way only in the second device 10b, because its private key K'(i) is needed. The second random number R(j,i) can be computed in this way only in the first device 10a, because its private key K'(j) is needed.

In a fourth step 24, processors 100 of each device 10a,b compute a one way hash function h(R(i,j), R(j,i)) of the random numbers, one of which is its "own" secret random number for the other, read from memory 106 of the device 10a,b, and the other of which is the number computed using its own private key. One way hash functions are known per se. One way hash is any function type with arguments wherein the size of the computation needed to determine the arguments from the result grows more rapidly than power of the number of digits in the result. The result is a "match number" M=h(R (i,j), R(j,i)).

The following may be noted about the process up to this point. The match numbers in the first and second device 10a, b will be equal if the preference numbers P1, P2 have been obtained using the public keys K(i), K(j) for the respective devices 10a,b. Only one pair of devices 10a,b can compute these correct match numbers M, because the relevant private keys K'(i) K'(j) are needed to obtain the same match numbers M.

An embodiment was described that uses numbers such as random numbers R, preference numbers P and match numbers M, which makes it possible to perform the computations using arithmetic circuits. However, it should be noted that any type of arithmetic system may be used. For example, the additions may be conventional integer additions, but instead bit for bit modulo 2 additions (exclusive ors) may be used. Similarly, the various functions F, G, h may be numeric functions, that treat their arguments as numbers, but instead functions may be used that treat their arguments as bit patterns or sets of numbers, without assuming that the bits together represent a single number.

Therefore, it should be realized that the embodiment merely describes an example of a process that uses a preference information number P(i), random numbers R(i,j) and a match number M, as examples of more general preference information items, protected information items and match data. The word "preference" is in preference information item as a label, referring to the fact that the item expresses eligibility (i.e. preference over non elected devices) of a second device 10b by a first device, when processed as described. Similarly, although an example of random numbers is shown, it should be realized that more generally random data may be used instead, or any other protected information item that is "protected" in the sense that the devices cannot know or reconstruct it without being supplied with it. As used herein a protected information item of a first device 10a is protected in the sense that among the devices 10a, 10b, 10 the item is accessible only for the second device 10b that has the appropriate key to decrypt it from a preference information item, and the first device 10a for which that has made that second device 10b eligible. The match number is an example of match data, which any data derived from a combination of the protected information of a pair of devices for the purpose of determining whether the devices should enable establishment of a communication session.

The addition of the identification number (or more generally identification information) is not indispensible. The addition is used when it is desirable to prevent that preference numbers are directed at multiple devices 10, 10a,b simultaneously. The fact that this number will be subtracted before the random numbers are decrypted makes it more difficult to construct preference numbers directed at multiple devices 10, 10a,b simultaneously. This possibility could arise if the results of decryption of the same preference number with different keys could be predicted. For example, if the same random number is successively encrypted using different keys of a commutative decryption scheme (a scheme wherein the result does not depend on the sequence of the decryptions), the result of decryption can be predicted by applying single ones of the two successive encryptions. RSA encryption is commutative for example. By forcing a subtraction this can be made more difficult. It should be appreciated that many other ways of combining data with the encrypted number can be used with the same effect, such as subtraction instead of addition, logic conversions etc. Of course, instead of addition of the identification number any easily reversible way of combining data with identification information may be used that is unique for a device, such as subtraction, modulo arithmetic operations, bitwise exclusive ORs etc.

If the first device 10a,b does not have a preference number for the second device 10b, or if it does not want to allow establishment of a communication session with the second device 10b, it can simply indicate the preference number for any other device 10 (not being the second device 10b) in the second step 22. This will have the effect that the match numbers M computed by the devices 10a,b will be different.

In a fifth step 25, a comparison of the computed match numbers is performed. If the comparison indicates that the match numbers are equal, the process proceeds to a sixth step 26, wherein a communication session is established. Otherwise, the process returns to first step 21 without establishing a communication session.

The comparison in fifth step 25 is preferably a committed comparison performed by processors 100 of first and second device 10a,b. Committed comparison of numbers is known per se. Its function is to determine whether two parties have the same number, while protecting against fraud wherein one party first infers the number from communication by the other party and then simply echo's that number to the other party to simulate a match. Committed comparison may be implemented using a combination of committed transmissions. Committed transmission may be implemented using a one way function of secret data and a first number to be compared, i.e. a function for which it is not practical to compute the first number from the function result, or to compute an alternative first number that yields the same function result. Committed transmission involves first transmitting the function result and later transmitting the secret number. Given the first number this enables the transmitting party to prove that it had the first number when it transmitted the function result.

Instead of committed comparison, a sets of first and second random numbers R1(i,j), R2(i,j) may be used instead of random numbers. Using these, first and second match numbers M1 and M2 may be computed respectively, in the same as described for the match number M. In this embodiment, first device 10a first transmits the first match number and second device 10b first transmits the second match number and after reception of these numbers the devices transmit the other match numbers. This makes one sided echoing ineffective. The first and second random numbers may be contained in a single preference information item, encrypted so that only one of the devices can encrypt them. Alternatively, first and second preference numbers may be used. However, by using committed comparison fewer stored numbers are needed.

FIG. 3 shows an example of an implementation of committed comparison. Herein processors 100 of the first and second device 10a,b execute a first step 31 wherein the processor 100 in each device 10a,b selects a further random number Q1, Q2 and applies a one way hash function h(..,..) to that random number and the match number M. This results in further numbers S1=h(Q1,M), S2=h(Q2,M) in the respective devices 10a,b. In a second step 32 processors 100 communicate the further numbers S1, S2 between the first and second device 10a,b via transmitter 102 and receiver 104. In this way, both devices are committed to their value of M without yet revealing it.

Subsequently, in a third step 33 processors 100 communicate the further random numbers Q1, Q2 between the first and second device 10a,b. In a fourth step 34 processors 100 use the further random numbers Q1, Q2 to test whether the devices had the same match number M, by comparing whether the previously transmitted further S1, S2 equals the hash of the match number with the further random number Q2, Q1 (i.e. testing whether S1=h(Q1,M) and S2=h(Q2,M). The local match numbers M may be used for this. Alternatively, the match numbers may be communicated for use in the comparison, but this may compromise security later. The requirement to perform second step 32, prevents devices 10a,b from echoing the other's match number.

The following may be noted about this process. The basic function of the process is to establish a communication session between a first and second device 10a,b, conditional on whether the first and second communication device have both supplied information indicating that this is allowed. In addition, the process is designed to protect against various forms of fraud or information leak.

Because a limited set of preference numbers has to be published before triggering the process that attempts to establish a session, it is prevented that a device can search without restriction for another device with which it can establish a communication session. The preference numbers commit the device secretly to a limited number of other devices. Furthermore, if no session is established because of at least one of the first and second device 10a,b has not indicated approval, this device 10a,b obtains no information whether the other device 10a,b did indicate approval. Thus, it is not possible to use an attack to make an unlimited search for devices that are enabled to establish a communication session with an attacking device, even if the attacker doesn't need establishment of a session.

Apart from preventing that information leaks out which devices are enabled to establish sessions with an attacking device, the process may also prevent fraudulent attempts to establish a session with any device. This is realized by using a committed comparison before disclosing the match number.

The number of preference numbers, or more generally preference information items, in the set of preference numbers that can be indicated by a device 10a,b, 10 is preferably a fraction of the number of devices 10, 10a,b in the system that could be made eligible. A fraction of less than half the devices may be used for example, with F*N preference numbers that can be indicated by a device 10a, where F<0.5 and N is the number of devices 10, 10a,b, with N say at least 10. Each set of preference numbers corresponds to a subset of the device 10, 10a,b in the system, which have the decryption keys to open the preference numbers in the set. Thus, the set of preference numbers that can be indicated by a particular device 10a, b, 10 corresponds to a subset of eligible devices of that particular device. The subsets of different particular devices may be mutually different, even discounting that the particular devices will not usually be part of their own subset. Typically at least some particular devices will have mutually different subsets. However, some particular devices may have the same subsets.

In a further embodiment, protection may be added against an attacking device 10 that provides a preference number to indicate that establishment of a session with a specific other device is enabled, without disclosing to that other device that such a preference number has been provided. In such an attack, the second device 10b might modify third step 33 of the committed comparison, by supplying a modified random number Q2' to the first device 10b, instead of the random number Q2 that was used in first step 31 of the committed comparison. Thus, second device 10b would be able to detect whether first device 10a had the correct match number, without revealing that second device 10b also had this match number.

Figure 4:
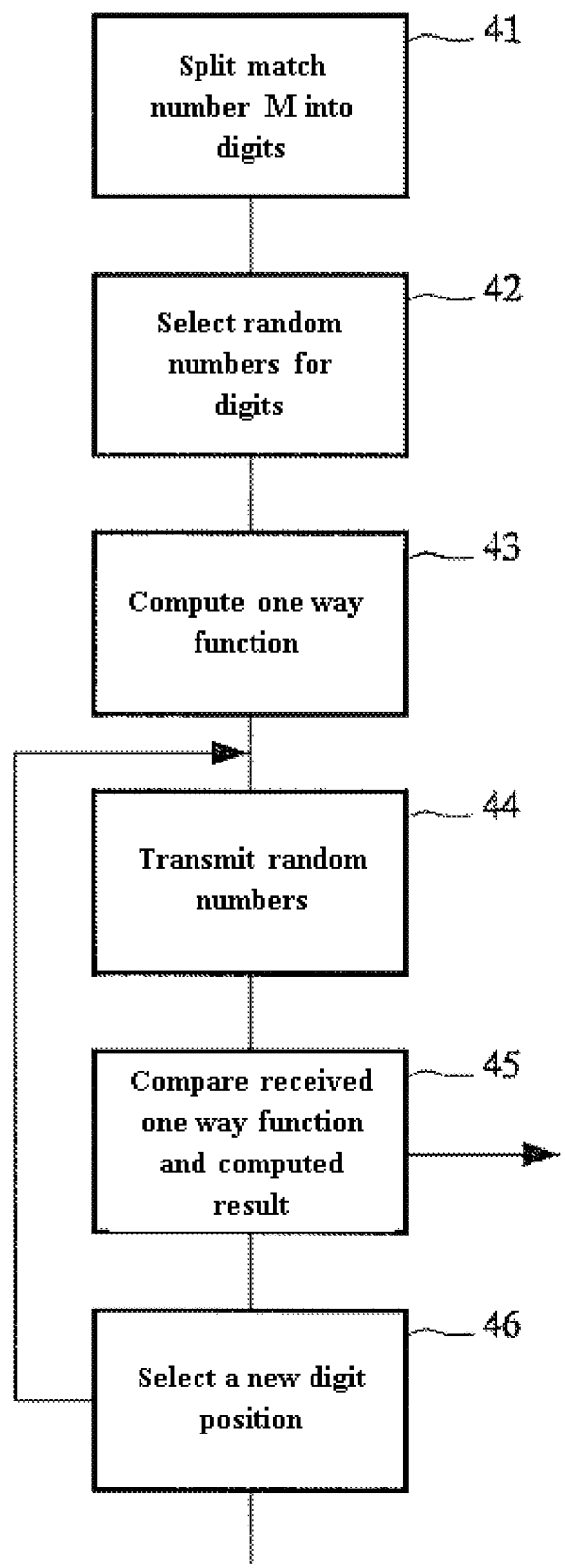
FIG. 4 shows a flow-chart of protected comparison

FIG. 4 shows a flow-chart for executing fifth step 25 (comparison) of the session establishment process. Herein a committed comparison of the match numbers is performed digit-for-digit. As a result knowledge about the equality of the match numbers builds up gradually in both the first and second device 10a,b. As a result, if any of the first and second device 10a,b break off the comparison before completion, its head-start in knowledge about the willingness of the other will be small (one digit).

In a first step 41, processors 100 of the first and second device 10a,b each split their match number M into a plurality of digits D(n). Binary digits, i.e. bits, may be used for example. In a second step 42, processor 100 in first device 10a selects random numbers Q1(n) for respective ones of the digits. Second device 10b similarly selects its own random numbers Q2(n).

In a third step 43 processor 100 of first device 10a computes a one way functions h(D(n),Q1(n)) of the digits and the random numbers and transmits the result to the second device 10b via transmitter 102. Second device 10b similarly computes and transmits the results of applying one way functions h(D(n),Q2(n)). Furthermore, processors 100 of first and second device 10a,b select a digit position "n".

In a fourth step 44 processors 100 of first and second device 10a transmit the random number Q1(n), Q2(n) for the selected digit position "n" to each other via transmitter 102 and receiver 104. With the transmitted random number Q1(n) or Q2(n) and the relevant digit D(n), each processor 100 recomputes the one way function h(D(n),Q1(n)) or h(D(n),Q2(n)) of which it received the result from the other device 10a,b. In a fifth step 45 processors 100 of first and second device 10a,b compare the previously received one way function result for the digit D(n) and their own computed result. If the two are not equal, the process is terminated without establishing a communication session. If the two are equal, a sixth step 46 is executed wherein the processors 100 select a new digit position and repeat from fourth step 44. If all digit positions have been processed the comparison has shown equality and the session will be established. Alternatively, the session may be established if only part of the digits has been processed, because the probability of inequality decreases with the number of processed digits. From a desired probability a threshold number of digits may be determined, after which the session may be established.

It may be noted that the random numbers Q1, Q2 are used to protect against mere echoing of the digits by a device 10a,b that simulates a match without having the match number. Protection against this may also be provided by using the devices 10a,b in different sequences for different digits. Thus the digit positions may be split into a first and second set of digit positions, first and second device 10a,b being obliged to transmit digits before the other at positions in the first and second set respectively. Second device 10b may be configured to transmit (reveal) information about digits from the first set of digit positions only after receiving corresponding digits from first device 10a. Similarly first device 10a may be configured to transmit information about digits from the second set of digit positions only after receiving corresponding digits from second device 10b. Different sequences may be used alternately in successive digit exchanges, odd and even digit positions belonging to the first and second set respectively, for example. Thus, a match cannot be simulated by echoing. In a further embodiment the use of random numbers Q1, Q2 may be omitted.

In an embodiment sixth step 46 may be modified so that processors 100 test whether a predetermined number T of digit positions "n" have been processed and if so execute a seventh step wherein the full match number is compared, or information indicative of full equality is compared. In this way, it can be avoided that many exchanges of random numbers are needed. Similarly, fewer random numbers need be generated. This can be done because after a number of steps the additional certainty gained about equality of the match number becomes small. Hence, no great head start is given away by comparing the full match number at that stage. In other words, if one device commits fraud at this stage, it remains suspect because of the high probability of match arrived at before this stage.

The predetermined number T may be selected on the basis of the number of preference numbers per device 10a,b, 10 and the number of devices 10a,b, 10, so that the head start is below a threshold. For example, with a hundred devices and three preference numbers per device the probability of a match is 0.9997 after comparing twenty bits, so that little certainty is given away by comparing the full match numbers after twenty bit comparisons.

In the processes described so far information other than the preference numbers is preferably communicated only between the relevant first and second device 10a,b and not to the remaining devices 10. This increases security, but requires a high communication load, because many pair to pair communications are needed.

In another embodiment parallel session establishment processes are performed, using information that is broadcast to a group of devices at the same time, or even to all devices 10. In this embodiment an indication is provided in advance for each first device 10a, which preference number of the other devices 10b, 10 it should use. Of course, each preference number is really only for one other device, but the same preference number may be indicated to other devices. Each preference number may be indicated to substantially the same number of devices: for example with four preference numbers per device and one hundred and one devices, each preference number may be indicated to twenty five devices. In a further embodiment, this indication may be encrypted using the public key of the first device 10a. The indications may be transmitted by the devices and/or stored in a commonly accessible memory (not shown).

In this embodiment the first device 10a performs the steps of the process of FIG. 2 for all other devices for which it has preference numbers. When it transmits information, it may do so to all other devices 10, 10b. Thus all devices obtain h(M, Q1) results S from the first device 10a, for each of its preference numbers and conversely the first device 10a obtains h(M,Q2) results S' from all other devices for each of its preference numbers in second step 32 of the committed comparison process of FIG. 3. After receiving these results S', the first device 10a broadcasts its random numbers Q1, to enable the selected devices to detect equality. Similarly, first device 10a receives the random numbers Q2 from the other devices 10, 10b, enabling it to determine which of its "favorite" other devices (devices for which first device 10a had preference numbers) have the right match number. After this, communication sessions may be established with those devices 10, 10b. The communication sessions may be established sequentially or in parallel.

Instead of using the comparison process of FIG. 3 in this broadcast embodiment, the digit-for-digit version of FIG. 4 may be used, if it is desired to protect against attacks wherein devices 10b, 10 dissimulate a match.

Although embodiments have been described that use an asymmetric encryption-decryption scheme to generate the preference information items, it should be appreciated that instead a symmetric encryption-decryption scheme may be used, with different keys for different devices provided that each decryption key is known to only one of the devices. In this case encryption is preferably performed by a trusted device (not shown), which is preferably not one of the devices that establish communication sessions and which has copies of the required keys to perform encryption. Thus, the trusted device may compute the preference number for example. In an embodiment, the device selects the random numbers R(i,j) and sends them to the trusted device, which encrypts them. Alternatively, the trusted device may also generate the random numbers and send them to the devices that need to store them. Encryption may be used in such transmissions to protect against eavesdropping.

Furthermore, as noted, although embodiments have been shown wherein numbers are used, it should be appreciated that more generally other types of information item may be used instead of numbers.

The communication sessions that are established conditional upon detection of a match may provide for a voice communication, and/or data communication for playing a game for example. A plurality of such communication sessions may be used to set up links in a network of communicating devices. The fact that communication sessions are established conditional upon detection of a match need not exclude that other communication may be enabled independent of a match. Thus for example, after voice communication is established between two devices, users may trigger a session establishment process as described to enable data communication. Alternatively, the communication session established conditional upon detection of a match may be the first established session between the devices. Although preferred examples have been described wherein the device 10a, 10b that has detected a match itself establish the communication session with another device 10a, 10b that itself has detected a match, it should be appreciated that the communication sessions may be established otherwise, for example between other apparatuses. In this case, devices 10a, 10b, 10 may be configured to output signals upon detection of a match, to signal to another apparatus, or to the user, that establishment of a communication session is enabled.

The number of preference information items that a device may indicate, i.e. the maximum size of the subset that a device can make eligible may be a predetermined number, which is the same for each device. In another embodiment this number may be variable. The number may depend on a subscription obtained by a user of the device for example. Although different preference information items that a device may indicate may all make mutually different devices eligible, it need not be excluded that some or all make the same devices eligible. Thus, for example if a user wants to make only a limited number of other devices eligible, the size of the set of preference information items does not force the user to make more devices eligible.

Examples have been shown wherein other devices are made eligible for establishing communication sessions with a particular device from that particular device, so that the user of the particular device can control the selection of the other devices. Alternatively, such a selection may be made from a further device, for example when the user has to be provided with a surprise selection of other devices.

The invention claimed is:

1. A method of establishing a communication session using a first and second device from a plurality of more than two devices in a communication system, wherein each device of the plurality is enabled to use a respective decryption key that is not available to other devices in the plurality, the method comprising:
    selecting, for each particular device of the plurality, a subset of eligible devices in the plurality that are eligible for establishing communication sessions;
    providing, for each particular device of the plurality, protected information items associated with the selected subset of eligible devices of the particular device, each of the protected information items being selectively retrievable in the particular device only;
    providing, for each particular device of the plurality, a respective set of preference information items for the selected subset of eligible devices of the particular device, each preference information item in the respective set of preference items comprising a respective protected information item associated with a respective eligible device in the selected subset of eligible devices, each of the respective protected information items being only accessible by means of the respective decryption key of the respective eligible device;
    making the respective sets of preference information items of at least the first and second device available to all of the devices in the plurality;
    triggering a communication session establishment process between the first and second device;
    indicating a first one of the available preference information items to the first device from the set of preference information items provided for the second device;
    indicating a second one of the available preference information items to the second device from the set of preference information items provided for the first device;
    decrypting protected information items from the first and second one of the preference information items in the first and second device using the decryption keys of the first and second device respectively;
    retrieving the retrievable protected information item associated with the indicated second and first one of the preference information items in the first and second device respectively;
    deriving match data from a computation of a one way function of a combination of the decrypted and retrieved protected information item in each of the first and second device;
    comparing the match data from the first and second devices; and
    enabling establishment of the communication session if the match data from the first and second devices match with each other.

2. The method according to claim 1, further comprising:
    exchanging commitment signals between the first and second device wherein the first and second device commit themselves to the match data; and
    performing said comparing subsequent to exchanging said commitment signals.

3. The method according to claim 1, further comprising:
    forming the preference information items each by encrypting the protected information items that are comprised in the preference information item; and
    combining the encrypted protected information item with an identification code that is unique for the eligible device associated with the protected information item.

4. The method according to claim 1, further comprising forming the preference information items each by encrypting the protected information item comprised in the preference information item, using an asymmetric encryption-decryption scheme.

5. The method according to claim 4, further comprising forming the set of each particular device in said particular device using the asymmetric encryption-decryption scheme with public keys for the respective ones of the eligible devices in the subset for the particular device.

6. The method according to claim 1, further comprising splitting the match data into a plurality of digits, and said comparing comprising:
    exchanging signals between the first and second device to commit to the digits individually;
    transmitting information about respective ones of the digits between the first and second device successively, each after commitment to the respective one of the digits by second and first device respectively;
    comparing the transmitted information about the respective ones of the digits successively; and
    breaking off said transmitting information about the respective ones of the digits and said comparing in response to detection of a mismatch between the digits.

7. The method according to claim 1, wherein
    a first signal is transmitted from the first device to the second device upon said triggering, the first signal performing said indicating the second one of the available preference information items to the second device; and
    a second signal is transmitted from the second device to the first device upon said triggering, the second signal performing said indicating the first one of the available preference information items to the first device.

8. The method according to claim 1, wherein assignments of the preference information items to the devices of the plurality are made available before said triggering, the assignments of each the preference information items including, among other assignments, an assignment to the respective eligible devices that has the decryption key needed to decrypt the protected information item from the preference information item.

9. The method according to claim 8, further comprising:
    decrypting, in the first device, protected information items from at least two reference information items for which assignments to the first device have been made available to the first device by at least two of the devices of the plurality respectively;

deriving a plurality of match data for the at least two devices in the plurality from a computation of a one way function of combinations of the decrypted protected information items and retrieved protected information items in the first device for the at least two of the devices;

broadcasting a commitment to the plurality of match data from the first device; and after receiving commitments from the at least two of the devices, broadcasting information about the plurality of match data from the first device and comparing the match data from the first device and information about match data from the at least two of the devices.

10. A communication device for use in a communication system that is configured to select a subset of eligible devices from a plurality of more than two devices that are eligible for establishing communication sessions with the communication device;

provide protected information items associated with the selected subset of eligible devices, each of the protected information items being selectively retrievable in the communication device only;

provide a first set of preference items for the selected subset of eligible devices, each preference information item in the first set of preference items comprising a respective protected information item associated with a respective eligible device in the selected subset of eligible devices, each of the respective protected information items being only accessible by means of a respective decryption key of the respective eligible device; and to make the first set of preference information items available to all of the devices in the plurality; the communication device comprising a transmitter, a receiver and a processing circuit, the processing circuit being configured to:

receive a trigger signal to trigger a communication session establishment process with a further device from the plurality in the communication system, after the first set of preference information items has been made available to all of the devices in the plurality;

decrypt a first protected information item from a first preference information item that is assigned to the communication device from a second set of preference items made available by the further device using a respective decryption key of the communication device that is not available to other devices in the plurality;

retrieve a second protected information item associated with a second preference information item that is assigned to the further device from the first set of preference information items;

derive match data from a computation of a one way function of a combination of the decrypted first and retrieved second protected information item;

obtain further match data from a match data signal received by the receiver from the further device;

compare the match data and the further match data; and enable establishment of the communication session between the communication device and the further device on condition that the match data computed in the communication device and the further match data match with each other.

11. The communication device according to claim 10, wherein the processing circuit is further configured to:

cause the transmitter to send a first message to the further device in response to the trigger signal, the first message indicating the second preference information item from the first set;

obtain an indication from a second message received by the receiver from the further device, the indication indicating the second preference information item from the second set, the match data being derived on the basis of the indication.

12. The communication device according to claim 10, wherein the processing circuit is further configured to:

exchange signals with the further device wherein the communication device and the further device commit themselves to the match data and perform said comparing subsequent to said exchanging.

13. The communication device according to claim 10, wherein the processing circuit is further configured to form the preference information items each by encrypting the protected information item associated with the preference information item using an asymmetric public key-private key encryption-decryption scheme.

14. The communication device according to claim 13, wherein the processing circuit is further configured to combine the encrypted protected information item with an identification code that is unique for the device that has the decryption key needed to decrypt the protected information item.

15. The communication device according to claim 13, wherein the processing circuit is further configured to broadcast assignments of the preference information items from the set of the communication device to at least two devices in the communication system, the assignments of each of the preference information items including, among other assignments, an assignment to the respective one of the devices that has the decryption key to decrypt the protected information item from the preference information item.

* * * * *